(12) United States Patent
Zelesky et al.

(10) Patent No.: US 10,364,679 B2
(45) Date of Patent: Jul. 30, 2019

(54) GAS TURBINE ENGINE COMPRESSOR ROTOR VAPORIZATION COOLING

(71) Applicant: UNITED TECHNOLOGIES CORPORATION, Farmington, CT (US)

(72) Inventors: Mark F. Zelesky, Bolton, CT (US); Michael Winter, New Haven, CT (US); Paul E. Coderre, East Hampton, CT (US); Richard L. Sykes, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 445 days.

(21) Appl. No.: 15/102,341

(22) PCT Filed: Dec. 2, 2014

(86) PCT No.: PCT/US2014/068065
§ 371 (c)(1),
(2) Date: Jun. 7, 2016

(87) PCT Pub. No.: WO2015/088823
PCT Pub. Date: Jun. 18, 2015

(65) Prior Publication Data
US 2016/0319667 A1 Nov. 3, 2016

Related U.S. Application Data

(60) Provisional application No. 61/915,272, filed on Dec. 12, 2013.

(51) Int. Cl.
*F01D 5/08* (2006.01)
*F02C 7/16* (2006.01)
(Continued)

(52) U.S. Cl.
CPC ............. *F01D 5/088* (2013.01); *F01D 5/181* (2013.01); *F02C 3/04* (2013.01); *F02C 7/16* (2013.01);
(Continued)

(58) Field of Classification Search
CPC ... F01D 5/181; F01D 5/34; F01D 5/08; F01D 5/085; F01D 5/087; F01D 5/088;
(Continued)

(56) References Cited

U.S. PATENT DOCUMENTS 2,812,157 A * 11/1957 Turunen ................. F01D 5/088
415/114
2,992,529 A * 7/1961 Sampietro ................ F02C 7/16
60/728

(Continued)

FOREIGN PATENT DOCUMENTS

| DE | 863391 | 1/1953 |
| EP | 2055895 A2 | 5/2009 |
| FR | 2090422 | 1/1972 |

OTHER PUBLICATIONS

International Search Report and Written Opinion for PCT Application No. PCT/US2014/068065, dated Mar. 27, 2015.
(Continued)

*Primary Examiner* — Scott J Walthour
*Assistant Examiner* — Jacek Lisowski
(74) *Attorney, Agent, or Firm* — Carlson, Gaskey & Olds, P.C.

(57) ABSTRACT

A gas turbine engine rotor includes a rotor that provides a cooling cavity. The cooling cavity has a first chamber and a second chamber that are fluidly connected to one another by a passageway. At least one of the first and second rotor portions is configured to support a blade that is fluidly isolated from the cavity. A phase change material is arranged
(Continued)

in the cavity. The phase change material is configured to be arranged in the first chamber in a first state and in the second chamber in the second state. The passageway is configured to carry the phase change material between the second and first chambers once changed between the first and second states.

20 Claims, 3 Drawing Sheets

(51) Int. Cl.
  *F02C 3/04* (2006.01)
  *F01D 5/18* (2006.01)
  *F01D 5/34* (2006.01)
(52) U.S. Cl.
  CPC ............ *F01D 5/34* (2013.01); *F05D 2220/32* (2013.01); *F05D 2240/81* (2013.01); *F05D 2260/207* (2013.01); *F05D 2260/208* (2013.01); *F05D 2260/232* (2013.01); *Y02T 50/676* (2013.01)
(58) Field of Classification Search
  CPC ...... F01D 5/303; F01D 5/3038; F01D 5/3046; F01D 5/3061; F01D 17/085; F02C 7/16; F02C 3/04; F02C 7/185
  See application file for complete search history.

(56) References Cited

U.S. PATENT DOCUMENTS

| | | | |
|---|---|---|---|
| 3,537,514 A * | 11/1970 | Levedahl | F28D 15/046 137/13 |
| 5,292,385 A * | 3/1994 | Kington | F01D 5/02 148/404 |
| 5,857,836 A | 1/1999 | Stickler et al. | |
| 6,192,670 B1 | 2/2001 | Kerrebrock | |
| 6,988,367 B2 | 1/2006 | Thompson Jr. et al. | |
| 7,062,900 B1 | 6/2006 | Brun | |
| 7,748,211 B2 | 7/2010 | Norris et al. | |
| 8,057,163 B2 | 11/2011 | Thompson, Jr. et al. | |
| 9,810,483 B2 * | 11/2017 | Bilski | F28F 13/14 |
| 2006/0222499 A1 * | 10/2006 | Warikoo | F01D 5/026 416/183 |
| 2007/0224047 A1 * | 9/2007 | Falk | F04D 29/284 416/97 R |
| 2010/0178169 A1 | 7/2010 | Webb | |
| 2011/0031299 A1 * | 2/2011 | Bray | B23K 20/12 228/112.1 |
| 2011/0142639 A1 | 6/2011 | Campbell et al. | |
| 2012/0087782 A1 | 4/2012 | Valiente et al. | |

OTHER PUBLICATIONS

The Extended European Search Report for EP Application No. 14869842.6, dated Sep. 14, 2017.
International Preliminary Report on Patentability for PCT Application No. PCT/US2014/068065, dated Jun. 23, 2016.

* cited by examiner

GAS TURBINE ENGINE COMPRESSOR ROTOR VAPORIZATION COOLING

CROSS-REFERENCE TO RELATED APPLICATIONS

This application claims priority to U.S. Provisional Application No. 61/915,272, which was filed on Dec. 12, 2013 and is incorporated herein by reference.

BACKGROUND

This disclosure relates to a vaporization cooling arrangement for a gas turbine engine rotor.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A circumferential array of blades is mounted on each rotor provided at various stages in the compressor and turbine sections. The thermal fight between the cold inner diameter of the rotor and the hotter portion near the core flow path can be significant, for example, over a 500° F. temperature differential between the inner and outer rotor portions. This temperature differential leads to a complex array of structural failure modes with various potential mitigations.

The temperature differential can be particularly problematic for rotors in the compressor section as thermal stress can be the limiting parameter in pushing compression ratios higher. Higher compression ratios can improve cycle thermal efficiency and better fuel burn with higher thrust to weight ratios.

SUMMARY

In one exemplary embodiment, a gas turbine engine rotor includes a rotor that provides a cooling cavity. The cooling cavity has a first chamber and a second chamber that are fluidly connected to one another by a passageway. At least one of the first and second rotor portions is configured to support a blade that is fluidly isolated from the cavity. A phase change material is arranged in the cavity. The phase change material is configured to be arranged in the first chamber in a first state and in the second chamber in the second state. The passageway is configured to carry the phase change material between the second and first chambers once changed between the first and second states.

In a further embodiment of the above, an array of circumferentially spaced blades is supported relative to the rotor.

In a further embodiment of any of the above, the blades include a root. The rotor includes a circumferential array of slots that receive the roots.

In a further embodiment of any of the above, the blades are integrally formed with the rotor.

In a further embodiment of any of the above, the outer chamber is arranged radially inward of the blade.

In a further embodiment of any of the above, the rotor includes first and second portions arranged axially relative to one another and secured at axial mate faces.

In a further embodiment of any of the above, the axial mate faces are friction welded to one another.

In a further embodiment of any of the above, the first chamber includes axially extending ribs.

In a further embodiment of any of the above, the second chamber is arranged in a bell-shaped portion of the rotor.

In a further embodiment of any of the above, the passageway includes an axial width that is less than an axial width of either of the first and second chambers.

In a further embodiment of any of the above, the phase change material is phosphorus-based.

In a further embodiment of any of the above, the phase change material is configured to transition from a liquid to a gas in the first chamber during engine operation. The phase change material is configured to transition from a gas to a liquid in the second chamber during engine operation.

In a further embodiment of any of the above, the rotor includes a plug sealing the cavity from an exterior of the rotor.

In another exemplary embodiment, a gas turbine engine includes a rotor that provides a cooling cavity. The cooling cavity has a first chamber and a second chamber that is arranged radially inward from the first chamber. The first and second chambers are fluidly connected to one another by a passageway. A circumferential array of blades is supported relative to the rotor. The blades are fluidly isolated from the cavity. A phase change material is arranged in the cavity. The phase change material is configured to be arranged in the first chamber in a first state and in the second chamber in the second state. The passageway is configured to carry the phase change material between the second and first chambers once changed between the first and second states.

In a further embodiment of the above, a combustor section is arranged axially between a compressor section and a turbine section. The rotor is arranged in the compressor section.

In a further embodiment of any of the above, the blades include a root. The rotor includes a circumferential array of slots that receive the roots.

In a further embodiment of any of the above, the blades are integrally formed with the rotor.

In another exemplary embodiment, a method of cooling a gas turbine engine rotor includes the steps of rotating a rotor with a phase change material contained within a cavity in the rotor, changing the phase of the phase change material near at a radially outer chamber of the cavity to cool a radially outer portion of the rotor and returning the changed phase of the phase change material to a radially inner chamber of the cavity.

In a further embodiment of the above, the method includes the step of transferring heat from a gas flow path of a compressor section to the radially outer portion and performing the phase changing step in response to the heat transferring step.

In a further embodiment of any of the above, blades are supported on the rotor, and the phase change material is isolated from the blades.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
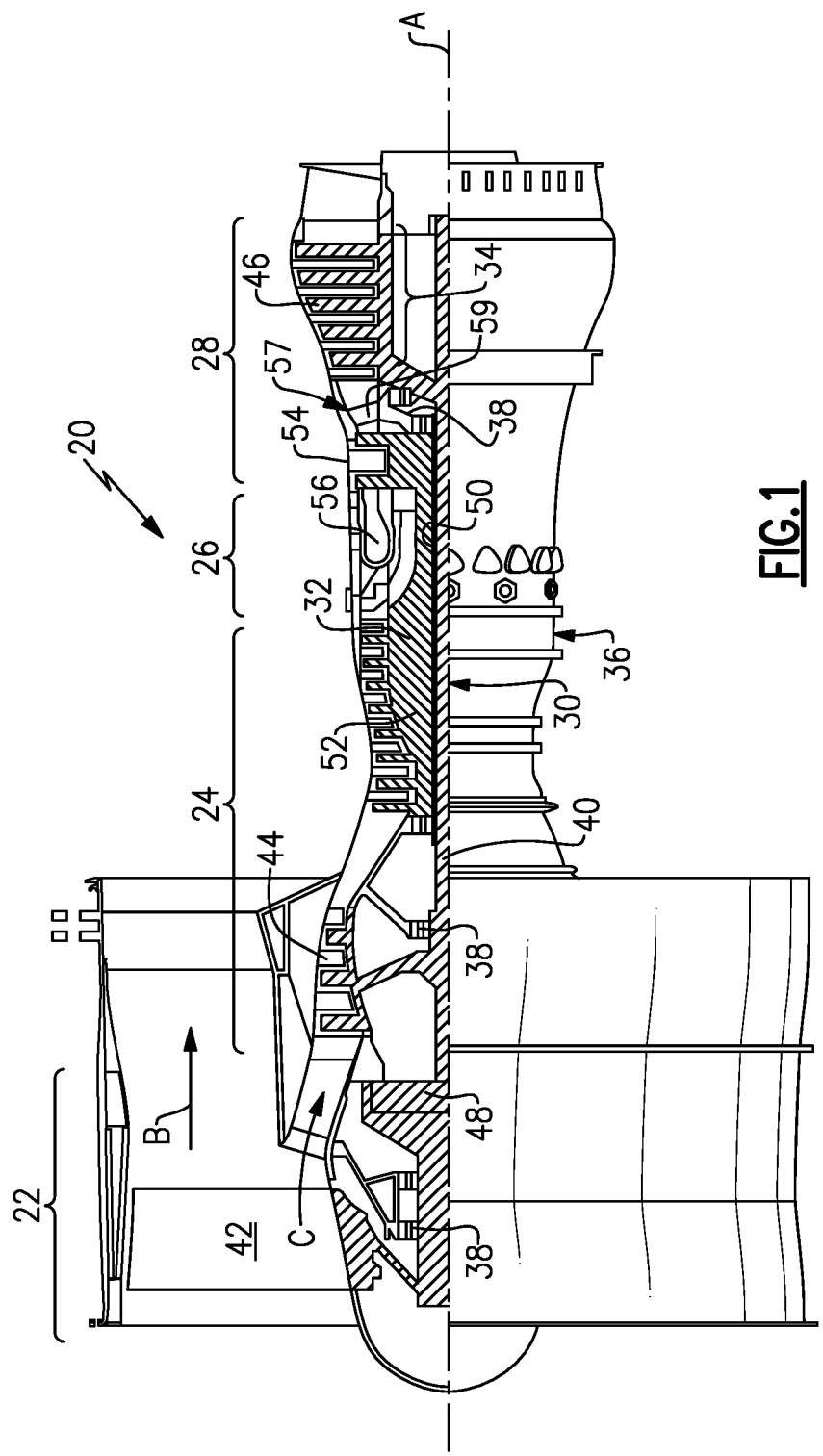
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The disclosure also relates to industrial and military gas turbine engines.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram} \, ° \, R)/(518.7° \, R)]^{0.5}$. The "Low corrected fan tip speed", as disclosed herein according to one non-limiting embodiment, is less than about 1150 ft/second.

A rotor 60 supports a circumferential array of blades 62. In the example illustrated, the circumferential array of blades 62 is arranged in a compressor section 24 and exposed to the core flow C. It should be understood, however, that the disclosed blade and rotor can be used in a turbine section as well.

Figure 2:
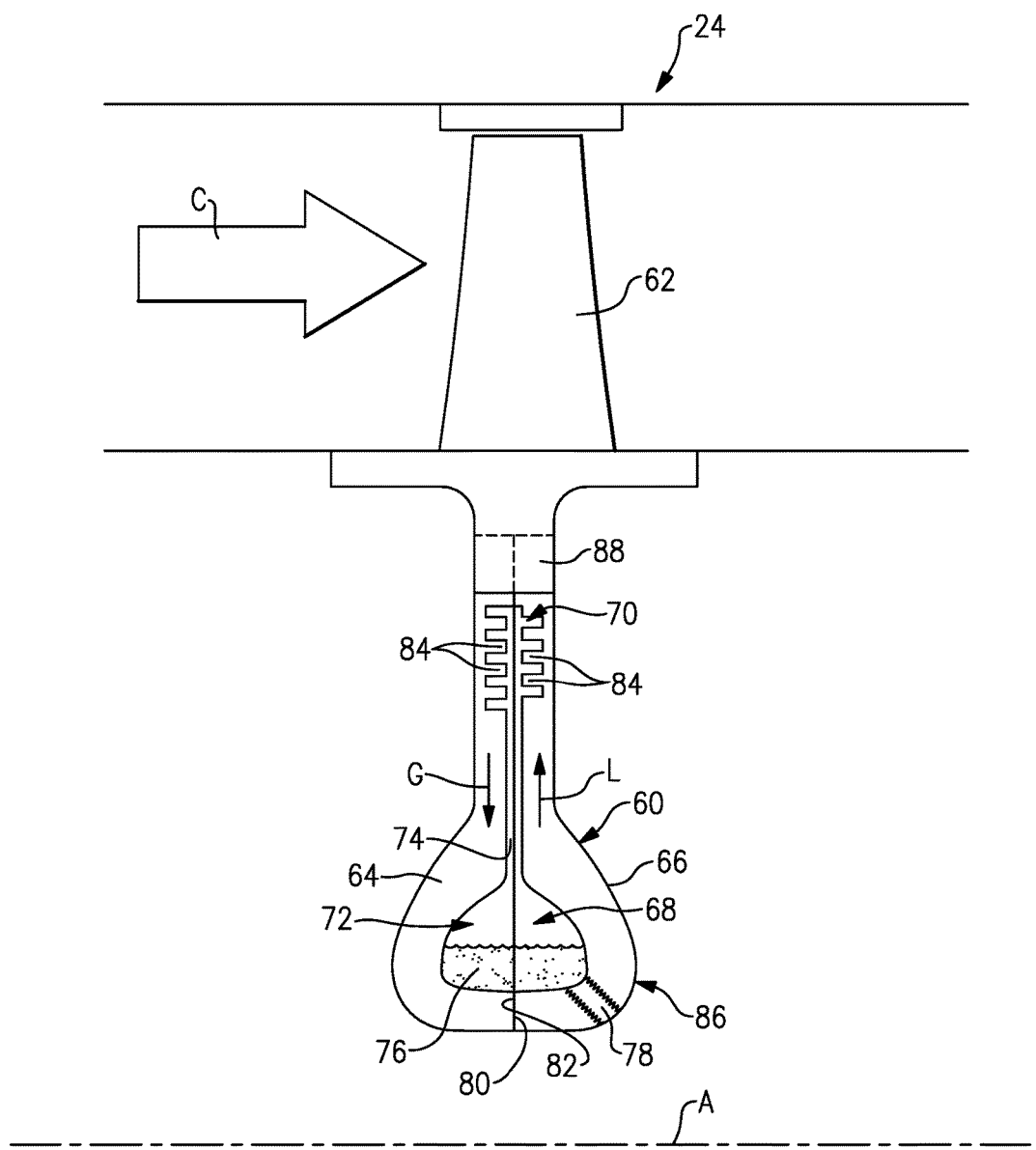
FIG. 2 is a schematic view of a stage within a compressor section.

The rotor 60 can be manufactured as a one-piece structure, or may include multiple portions secured to one another in some manner. In the example shown in FIGS. 2-4, the rotor 60 includes first and second rotor portions 64, 66 that are secured to one another to form a cavity 68. The first and second rotor portions 64, 66 respectively include axial mate faces 80, 82 that are joined to one another, for example, by linear friction welding.

The cavity 68 includes first and second chambers 70, 72 that are respectively arranged near radially outer and inner portions of the rotor 60. A passageway 74 fluidly interconnects the first and second chambers 70, 72. In the example, the axial width of the passageway 74 is less than the axial width of either of the first and second chambers 70, 72 to inhibit fluid flow between the chambers.

The cavity 68 is partially filled with a phase change material 76. In the example, the phase change material 76 is configured to change from a liquid to a gas at around 1000° F. In another example, the phase change material 76 is a phosphorus-based or sodium-based substance, or a mixture thereof. A plug 78 is installed into the rotor 60 once the phase change material 76 has been placed into the cavity 68 subsequent to joining the first and second portions 64, 66.

The first chamber 70 may include ribs 84 that provide increased surface area to more quickly transfer heat to the phase change fluid. The cooling features, such as the ribs 84 are machined using line of sight operations, such as turning, grinding, electro-discharge machining and any other suitable methods. The second chamber 72 is arranged at a bell-shaped portion 86 of the rotor 60, which is the coolest part of the rotor 60 located most interiorly within the engine 10.

In operation, the rotor 60 spins at relatively high speeds about the axis A. The centrifugal force moves the liquid into the first chamber 70. As heat is transferred from the core flow path to the outer portion of the rotor 60, the phase change material 76 is heated until a phase change occurs. In the example, the phase change material 76 changes from a liquid to a gas. The gas then flows from the first chamber 70 through the passageway 74 into the second chamber 72. Once in the second chamber 72, the phase change material 76 cools and condenses forming a liquid, which is subsequently forced radially outwardly back into the first chamber 70 through the passageway 74 from centrifugal force. This cooling generally creates an isothermal rotor enabling heat to be quickly transferred from the outer portion of the rotor to the inner portion.

The rotor configuration with the phase change material enables an isothermal rotor that eliminates complex failure modes, such as low-cycle fatigue, thermal mechanical fatigue, and creep, by reducing the thermal fight within the rotor. An isothermal rotor reduces T3 (high compressor stage) temperature-related failures, enabling higher overall pressure ratios, increased efficiency and fuel burn.

Figure 3:
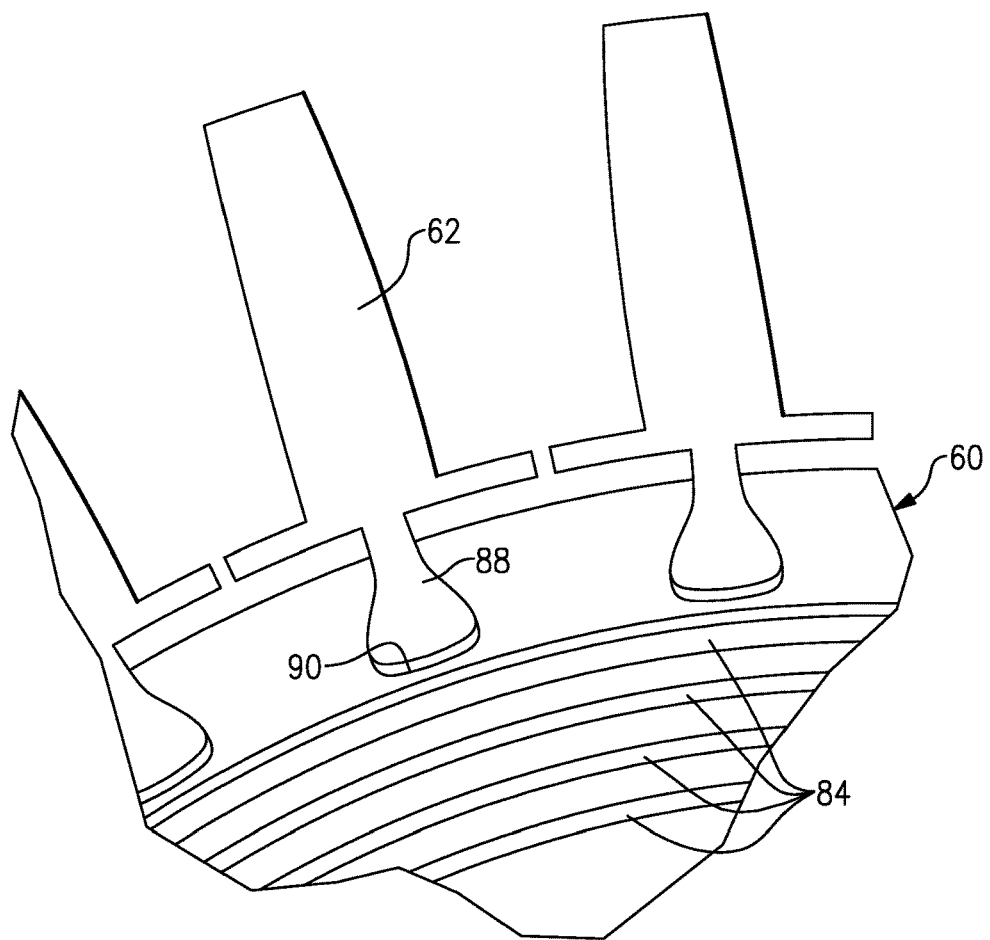
FIG. 3 is a cross-sectional view through a rotor supporting a circumferential array of blades.
Figure 4:
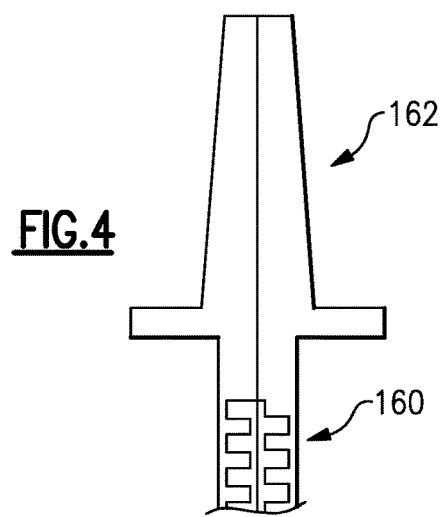
FIG. 4 is a schematic view illustrating a multipiece rotor integrated with the blades.

As shown in FIG. 3, the blades 62 may include roots 88 received in slots 90 in the rotor 60. Alternatively, the blades 162 may be integrally formed with the rotor 160, as shown in FIG. 4. The blades 62/162 are fluidly isolated from the rotor 60/160.

The rotors 60/160 can be manufactured using any suitable method, including conventional casting techniques or additive manufacturing, for example. Additive manufacturing may more readily enable the rotor to be formed as a unitary structure. Lost wax casting may also permit casting of the internal ribs.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of cooling a gas turbine engine rotor assembly, the gas turbine engine rotor assembly comprising a rotor having a disc, the method comprising the steps of:
   rotating the rotor with a phase change material contained within a cavity in the rotor;
   changing a phase of the phase change material at a radially outer chamber of the cavity to cool a radially outer portion of the rotor; and
   returning the changed phase of the phase change material to a radially inner chamber of the cavity via a passageway having an axial width that is less than an axial width of either of the inner and outer chambers,
   wherein the radially outer chamber, the radially inner chamber, and the passageway are each defined within the disc of the rotor.

2. The method according to claim 1, comprising the step of transferring heat from a gas flow path of a compressor section to the radially outer portion of the rotor, and performing the phase changing step in response to the heat transferring step.

3. The method according to claim 1, wherein blades are supported on the rotor, and the phase change material is isolated from the blades.

4. A gas turbine engine rotor assembly comprising:
   a rotor having a disc, the rotor providing a cooling cavity, the cooling cavity has a first chamber and a second chamber fluidly connected to one another by a passageway, a portion of the rotor is configured to support a blade that is fluidly isolated from the cooling cavity; and
   a phase change material is arranged in the cooling cavity, the phase change material is configured to be arranged in the first chamber in a first state and in the second chamber in a second state, the passageway is configured to carry the phase change material between the second and first chambers, wherein the passageway includes an axial width that is less than an axial width of either of the first and second chambers,
   and wherein the first chamber, the second chamber, and the passageway are each defined within the disc of the rotor.

5. The gas turbine engine rotor assembly according to claim 4, comprising an array of circumferentially spaced blades supported relative to the rotor.

6. The gas turbine engine rotor assembly according to claim 5, wherein each of the circumferentially spaced blades includes a root, and the rotor includes a circumferential array of slots that receive the roots.

7. The gas turbine engine rotor assembly according to claim 5, wherein each of the circumferentially spaced blades is integrally formed with the rotor.

8. The gas turbine engine rotor assembly according to claim 5, wherein the first chamber is arranged radially inward of the blade.

9. The gas turbine engine rotor assembly according to claim 4, wherein the rotor includes first and second portions arranged axially relative to one another and secured at axial mate faces.

10. The gas turbine engine rotor assembly according to claim 9, wherein the axial mate faces are friction welded to one another.

11. The gas turbine engine rotor assembly according to claim 4, wherein the first chamber includes axially extending ribs.

12. The gas turbine engine rotor assembly according to claim 4, wherein the second chamber is arranged in a bell-shaped portion of the disc of the rotor.

13. The gas turbine engine rotor assembly according to claim 4, wherein the phase change material is phosphorus-based.

14. The gas turbine engine rotor assembly according to claim 1, wherein the phase change material is configured to transition from a liquid to a gas in the first chamber at a temperature of substantially 1000° F., and the phase change material is configured to transition from a gas to a liquid in the second chamber at a temperature of substantially 1000° F.

15. The gas turbine engine rotor assembly according to claim 4, wherein the rotor includes a plug sealing the cooling cavity from an exterior of the rotor.

16. The gas turbine engine rotor assembly according to claim 4, wherein the first and second chambers are arranged radially inward of the blade.

17. A gas turbine engine comprising:
a rotor having a disc, the rotor providing a cooling cavity, the cooling cavity has a first chamber and a second chamber that is arranged radially inward from the first chamber, the first and second chambers are fluidly connected to one another by a passageway;
an array of circumferentially spaced blades supported relative to the rotor, each of the circumferentially spaced blades are fluidly isolated from the cooling cavity; and
a phase change material is arranged in the cooling cavity, the phase change material is configured to be arranged in the first chamber in a first state and in the second chamber in a second state, the passageway is configured to carry the phase change material between the second and first chambers, wherein the passageway includes an axial width that is less than an axial width of either of the first and second chambers,
and wherein the first chamber, the second chamber, and the passageway are each defined within the disc of the rotor.

18. The gas turbine engine according to claim 17, comprising a combustor section arranged axially between a compressor section and a turbine section, the rotor arranged in the compressor section.

19. The gas turbine engine according to claim 17, wherein each of the circumferentially spaced blades includes a root, and the rotor includes a circumferential array of slots that receive the roots.

20. The gas turbine engine according to claim 17, wherein each of the circumferentially spaced blades are integrally formed with the rotor.

* * * * *